(12) United States Patent
Youssef

(10) Patent No.: US 9,135,755 B2
(45) Date of Patent: Sep. 15, 2015

(54) HEALTH MONITORING OF IGNITERS

(71) Applicant: Pratt & Whitney Canada Corp., Longueuil (CA)

(72) Inventor: Michael Youssef, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 15 days.

(21) Appl. No.: 13/957,526

(22) Filed: Aug. 2, 2013

(65) Prior Publication Data

US 2015/0036781 A1 Feb. 5, 2015

(51) Int. Cl.
*G06F 19/00* (2011.01)
*G07C 3/08* (2006.01)

(52) U.S. Cl.
CPC .......................................... *G07C 3/08* (2013.01)

(58) Field of Classification Search
USPC .................................................... 701/99–115
See application file for complete search history.

(56) References Cited

U.S. PATENT DOCUMENTS

| | | | |
|---|---|---|---|
| 4,843,556 A * | 6/1989 | Wakeman et al. | 701/111 |
| 4,943,924 A * | 7/1990 | Kanegae et al. | 701/115 |
| 5,675,257 A * | 10/1997 | Frus | 324/380 |
| 5,852,381 A | 12/1998 | Wilmot et al. | |
| 6,195,247 B1 | 2/2001 | Cote et al. | |
| 7,191,084 B2 | 3/2007 | Ponziani | |
| 7,322,197 B2 | 1/2008 | Kudrna et al. | |
| 8,146,408 B2 | 4/2012 | Snow | |
| 2007/0135987 A1 | 6/2007 | Coffey et al. | |
| 2012/0125007 A1 | 5/2012 | Steffler | |

* cited by examiner

*Primary Examiner* — Brandon S Cole

(74) *Attorney, Agent, or Firm* — Norton Rose Fulbright Canada LLP

(57) ABSTRACT

Methods and associated devices useful for the health monitoring of igniters of gas turbine engines are disclosed. Exemplary embodiments disclosed include the use of an accumulated spark count to an igniter to obtain an indication of wear on the igniter and/or the remaining life of the igniter. An exemplary method disclosed includes: receiving one or more signals indicative of a commanded spark count to the igniter for one or more ignition events; processing the one or more signals indicative of the commanded spark count to the igniter, determining a total accumulated commanded spark count to the igniter; and generating one or more signals indicative of at least one of an estimated wear on the igniter or an estimated remaining life of the igniter based on the total accumulated commanded spark count to the igniter.

20 Claims, 5 Drawing Sheets

HEALTH MONITORING OF IGNITERS

TECHNICAL FIELD

The disclosure relates generally to health monitoring, and more particularly to the health monitoring of igniters for gas turbine engines.

BACKGROUND OF THE ART

The reliability of aircraft engines is of critical importance and one technique for improving the reliability of such engines is to estimate the operational lifetime of critical components in the engine and repair or replace those components before they have an unacceptable probability of failure. The ignition system is a critical part of a gas turbine engine and usually comprises an igniter that is used to provide spark to the combustion chamber to initiate or maintain combustion. The ignition system is typically used during engine startup, but can also be used in other situations.

Igniters are subject to wear during use and must be periodically replaced. This wear typically takes the form of erosion of the electrodes on an igniter. Eventually, the erosion can cause the gap between electrodes to become larger, which can negatively impact the reliability of the igniter and may eventually make the igniter inoperable.

Existing methods for estimating the life of igniters have had limited accuracy. Such inaccuracy in life estimation can result in an igniter being repaired or replaced prematurely or, alternatively, result in a failure or degradation of performance before it is replaced.

Improvement is therefore desirable.

SUMMARY

The disclosure describes systems, devices and methods useful for the health monitoring of igniters in gas turbine engines. In various embodiments disclosed, an accumulated spark count may be used to obtain an indication of wear on the igniter(s) and/or the remaining life of the igniter(s). In various embodiments, the indication of wear and/or remaining life of the igniter(s) may be used as a basis for the scheduling and/or performance of maintenance-related activities such as one or more corrective or preventive actions. For example, the indication of wear and/or remaining life of the igniter(s) may be used as a basis for taking a maintenance action such as inspecting, servicing or replacing the igniter(s).

In one aspect, the disclosure describes a method for generating a signal useful in the health monitoring of an igniter of a gas turbine engine. The method may comprise:

receiving one or more signals indicative of a commanded spark count to the igniter for one or more ignition events;

processing the one or more signals indicative of the commanded spark count to the igniter, determining a total accumulated commanded spark count to the igniter; and generating one or more signals indicative of at least one of an estimated wear on the igniter or an estimated remaining life of the igniter based on the total accumulated commanded spark count to the igniter.

In another aspect, the disclosure describes a method for generating a signal useful in the health monitoring of an igniter of a gas turbine engine where the method is performed by a digital engine controller of the gas turbine engine. The method may comprise:

receiving one or more signals indicative of a commanded spark rate and one or more signals indicative of a commanded spark duration for one or more ignition events of the igniter;

processing the one or more signals, determining a total accumulated commanded spark count to the igniter; and generating one or more signals indicative of at least one of an estimated wear on the igniter or an estimated remaining life of the igniter based on the total accumulated commanded spark count to the igniter.

In a further aspect, the disclosure describes a non-transient computer-readable medium or media comprising data representing instructions configured for causing a digital engine controller of a gas turbine engine to:

using data indicative of a commanded spark count to the igniter for one or more ignition events, determine a accumulated commanded spark count to the igniter and generate data indicative of the accumulated commanded spark count;

generate data indicative of at least one of an estimated wear on the igniter or an estimated remaining life of the igniter based on the total accumulated commanded spark count to the igniter; and store the data indicative of at least one of an estimated wear on the igniter or an estimated remaining life of the igniter in persistent computer-readable memory.

Further details of these and other aspects of the subject matter of this application will be apparent from the detailed description and drawings included below.

DESCRIPTION OF THE DRAWINGS

Reference is now made to the accompanying drawings, in which.

DETAILED DESCRIPTION

Aspects of various embodiments are described through reference to the drawings.

Figure 1:
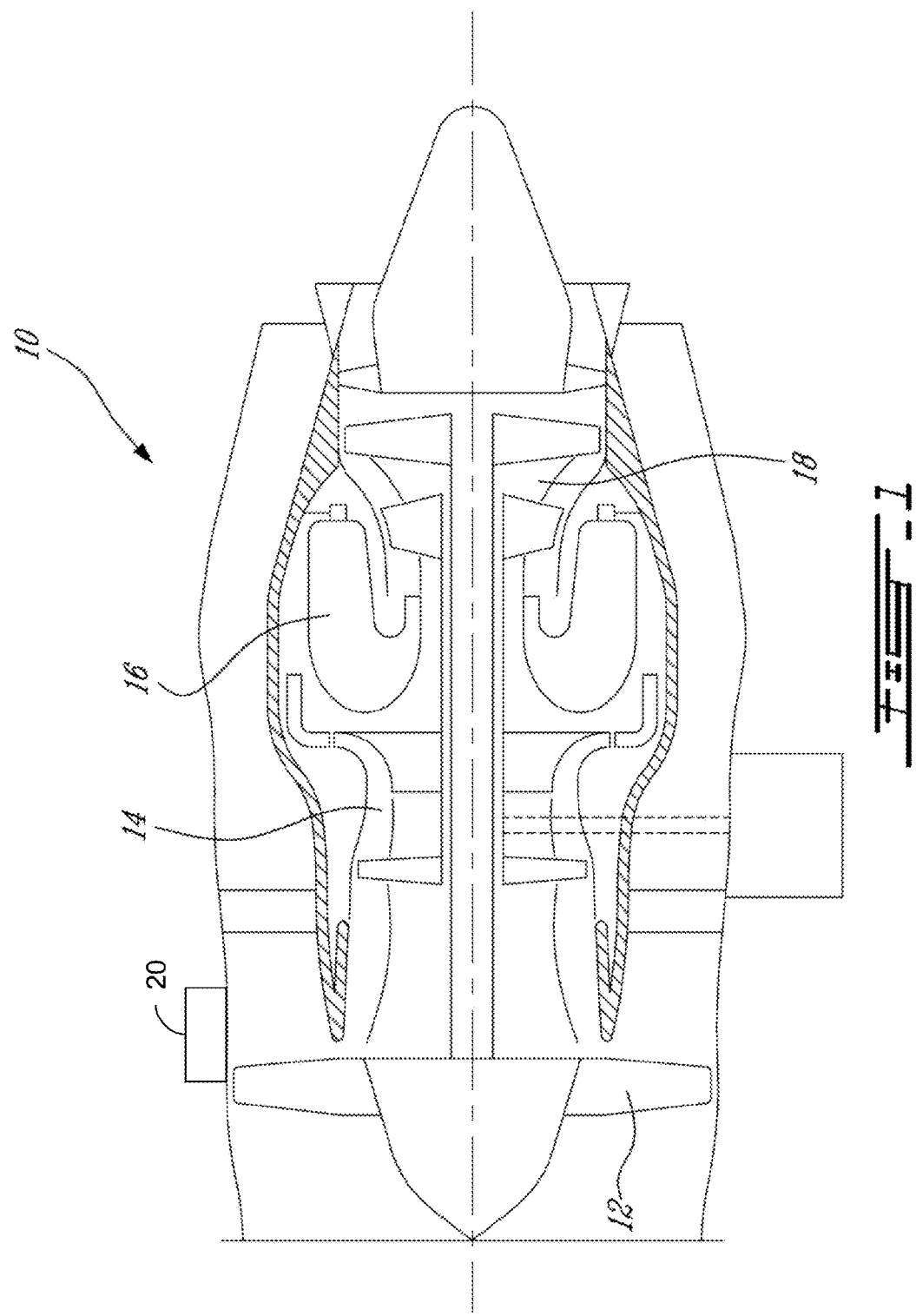
FIG. 1 is a schematic representation of an axial cross-section view of a turbo-fan gas turbine engine.

FIG. 1 illustrates a schematic representation of a gas turbine engine 10 of a type preferably provided for use in subsonic flight, generally comprising in serial flow communication fan 12, through which ambient air is propelled, multistage compressor 14 for pressurizing the air, combustor 16 in which the compressed air is mixed with fuel and ignited for generating an annular stream of hot combustion gases, and a turbine section 18 for extracting energy from the combustion gases.

Engine 10 may also comprise one or more controllers 20 that may control at least some aspect of the operation of engine 10. For example, controller 20 may comprise a digital engine controller. In various embodiments, controller 20 may include or form part of a Full Authority Digital Engine Control (FADEC) which may, for example, comprise one or more digital computers or other data processors, sometimes referred to as electronic engine controller(s) (EEC) and related accessories that control at least some aspects (e.g., fuel flow) of performance of engine 10. Controller 20 may, for example, be configured to make decisions regarding the control of engine 10 until a pilot wishes to or is required to intervene. Controller 20 may be configured to achieve optimum engine efficiency for a given flight condition. As data processors, controller(s) 20 may include one or more microcontrollers or other suitably programmed or programmable logic circuits.

While engine 10 may be illustrated herein as a turbofan type of gas turbine engine, it is understood that various aspects of the present disclosure could apply to and be used in conjunction with other types of gas turbine engines such as turbo-shaft or turbo-prop engines. For example, engine 10 may comprise a conventional or other type of gas turbine engine suitable for use in aircraft or ground applications.

Figure 2:
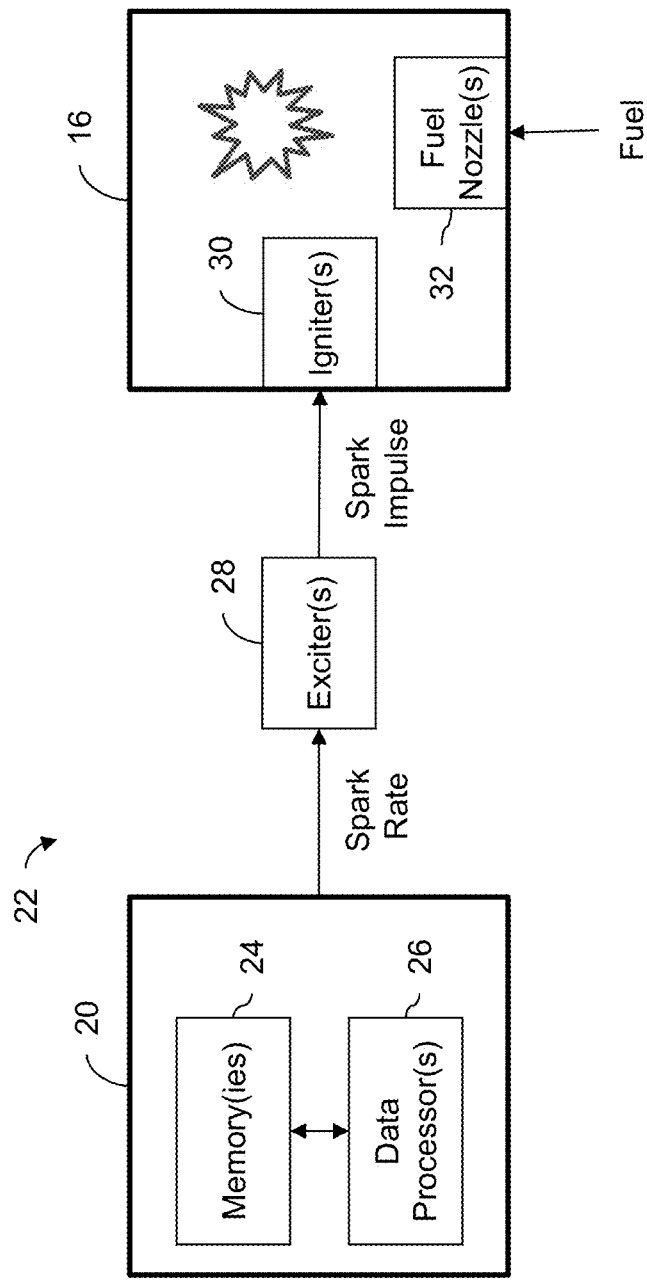
FIG. 2 is a schematic representation of an ignition system for the engine of FIG. 1.

FIG. 2 illustrates a schematic representation of an exemplary ignition system 22 that may be incorporated in engine 10. While controller 20 may control one or more aspects of the operation of engine 10, controller 20 may additionally serve a role in ignition system 22. Controller 22 may comprise memory(ies) 24 and data processor(s) 26. Memory(ies) 24 may comprise any storage means (e.g. devices) suitable for retrievably storing machine-readable instructions executable by processor(s) 26. For example, memory(ies) 24 may include erasable programmable read only memory (EPROM) and/or flash memory or other electromagnetic media suitable for storing electronic data signals in volatile or non-volatile, non-transient form. Memory(ies) 24 may be non-volatile and at least part of which may be used for persistent storage of data. Memory(ies) 24 may contain machine-readable instructions for execution by processor(s) 26. Such machine-readable instructions may cause the digital processor(s) 32 to compute and output signals that may be used to control one or more aspects of engine 10.

Ignition system 22 may comprise one or more exciters 28 and one or more igniters 30. As shown in FIG. 2, exciter 28 may configured to receive a commanded spark rate from controller 20 and accordingly produce spark impulses that are used to drive igniter 30 at the commanded spark rate. Igniter 30 may be configured to generate sparks inside combustor 16 in response to the spark impulses generated by exciter 28. Igniter 30 may be used to initiate combustion of fuel delivered to combustor 16 via one or more fuel nozzles 32. For example, igniter 30 may be used to initiate combustion inside combustor 16 during initial starting of engine 10 and/or may be used to re-initiate combustion inside combustor 16 during a flame-out event which may have occurred during operation of engine 10 (e.g., during flight).

The spark rate and the duration of the sparking (i.e., the duration of the ignition event) may be commanded by controller 20. In various embodiments, the spark rate and/or duration of the ignition event may be selected by controller 20 based on sensed or other parameters. For example, the spark rate and/or duration of the ignition event may be pre-determined and fixed or may be variable and determined based on one or more environmental conditions, operational conditions of engine 10 and/or other conditions. In some embodiments, a commanded ignition event may be automatically terminated by controller 20 once ignition in combustor 16 has been detected and/or confirmed by any suitable means.

Alternatively, the spark rate and/or duration of the ignition event may be selected by an operator of engine 10 such as, for example, a pilot or maintenance personnel of an aircraft to which engine 10 may be mounted. In such embodiments, controller 20 may receive one or more signals indicative of an operator-selected ignition event and may command exciter 28 according to operator-defined instructions. In any event, controller 20 may be configure to initiate, control and terminate ignition events automatically and/or in response to received input(s) from one or more sensor(s) and/or operator(s) of engine 10.

Figure 3:
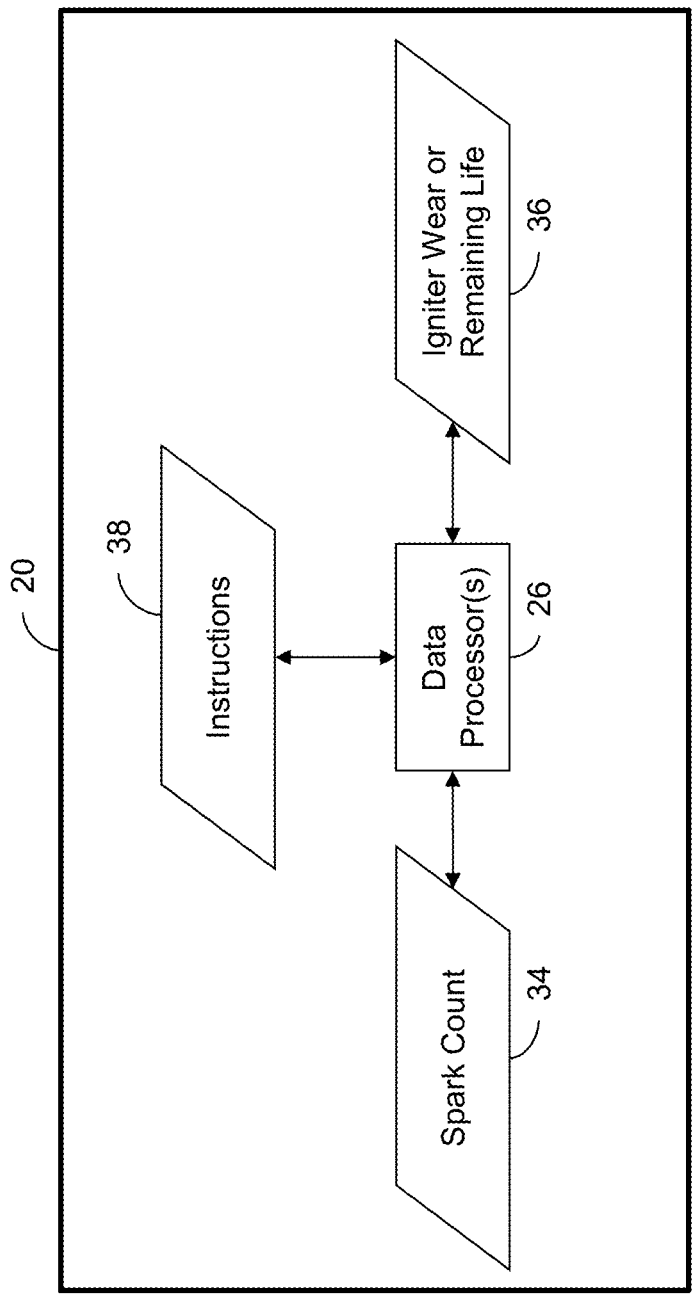
FIG. 3 is a schematic representation of a digital controller for the engine of FIG. 1 where the digital controller is configured to conduct health monitoring of an igniter of the ignition system of FIG. 2.

FIG. 3 shows a schematic representation of controller 20 configured to conduct health monitoring of igniter 30 of ignition system 22. As mentioned above, controller 20 may comprise components additional to those shown in FIG. 3 and may control additional aspects of engine 10 including ignition events. FIG. 3 shows features of controller 20 that may be associated with the health monitoring of one or more igniters 30. For example, data processor 26 may be configured to receive one or more signals 34 indicative of a commanded spark count to igniter 30 for one or more ignition events; process the one or more signals 34 indicative of the commanded spark count; and, generate one or more signals 36 indicative of at least one of an estimated wear on igniter 30 or an estimated remaining life of igniter 30. The processing of signal(s) 34 indicative of commanded spark count and the generation of signal(s) 36 indicative of the estimated wear or remaining life of igniter 30 may be executed by data processor 26 based on instructions 38.

Spark count signal(s) 34, wear/remaining life signal(s) 36 and instructions 38 may be in the form of electronic data stored on memory(ies) 24 of controller 20. While FIG. 3 shows that health monitoring of igniter 30 may be conducted by controller 20, which may also control other aspects of the operation of engine 10, it is understood that at least portions of the methods disclosed herein could also or instead be conducted by one or more other data processing devices which may not be part of controller 20 and/or that may not take part in controlling any aspects of the operation of engine 10. For example, the other data processing device(s) located remotely from engine 10 could be used to conduct health monitoring of igniter 30. In various embodiments where engine 10 may mounted to an aircraft, such data processing device(s) could be disposed elsewhere on the aircraft and may be used for health monitoring and/or control of other aircraft systems as well. Alternatively, such data processing device(s) may be located on ground at the facility of an operator or custodian of engine 10. It is also understood that methods disclosed herein could be conducted in substantially real-time (e.g., via controller 20) or could be conducted at some later time based on mission/flight data.

Figure 4:
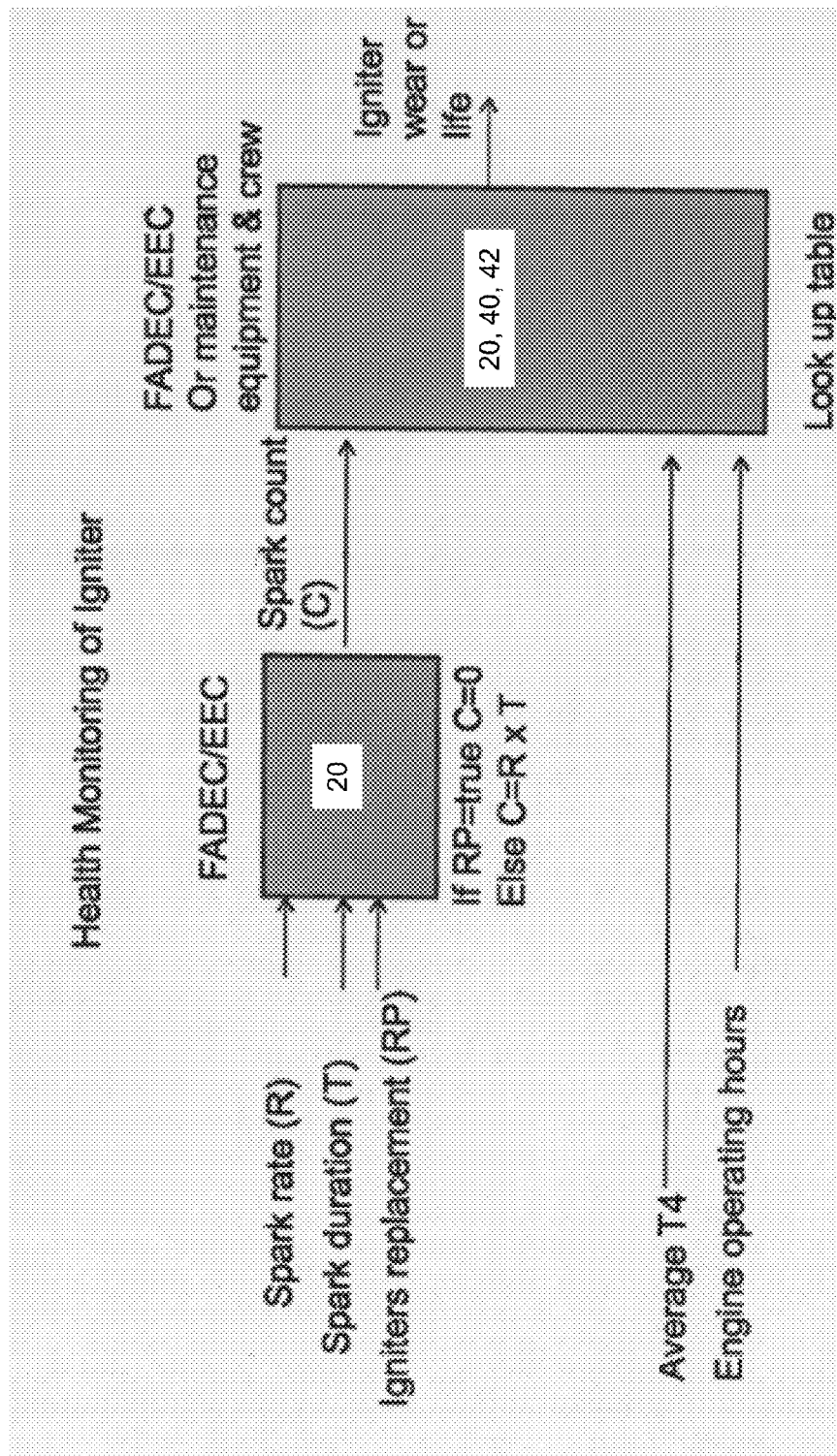
FIG. 4 is another schematic representation of a digital controller for the engine of FIG. 1 where the digital controller is configured to conduct health monitoring of the igniter of the ignition system of FIG. 2.

FIG. 4 is another schematic representation of controller 20 configured to conduct health monitoring of igniter 30. For example, the one or more signals 34 indicative of a commanded spark count may comprise one or more signals indicative of a commanded spark rate (R) and one or more signals indicative of a commanded spark duration (T). Controller 20 may then compute the spark count (C) by multiplying the commanded spark rate (R) by the commanded spark duration (T). In various embodiments, the spark rate (R) and spark duration (T) values may be for one or more ignition events. In order to get an indication of accumulated wear on a particular igniter 30, controller 20 may be configured to keep track of a total accumulated number of sparks commanded to that igniter 30 since the entry into service (e.g., igniter replacement (RP)) of that igniter 30. Accordingly, such accumulated spark count (C) may provide an indication of wear on igniter 30.

The accumulated spark count (C) may be compared to an estimated total number of sparks available from igniter 30 in order to provide an indication of the estimated remaining life of igniter 30. For example, controller 20 may be configured (via instructions 38 in FIG. 3) to compute an estimated remaining number of sparks available in the life of igniter 30 by subtracting the accumulated spark count (C) from the estimated total number of sparks available from igniter 30. Alternatively or in addition an indication of remaining life of igniter 30 may be in the form of an estimated number of hours of operation remaining for igniter 30. The estimated number of hours of operation may be those of engine 10 but may still, in some embodiments, be based on the accumulated spark count (C) and/or the estimated remaining number of sparks available in the life of igniter 30.

The estimated total number of sparks available from igniter 30 may, for example, be dependent on the specific application for which igniter 30 is used and may be selected based on a number of factors. For example, the estimated total number of sparks available from igniter 30 may be determined by experimentation under test conditions approximating the real (e.g., environmental) conditions to which igniter 30 will be subjected. Alternatively, the estimated total number of sparks available from igniter 30 may be determined based on past field data related to similar igniters operating under similar operating conditions. In various embodiments, the estimated total number of sparks available from igniter 30 may be determined based on a desired level of performance required of igniter 30 and may accordingly be determined based on estimated levels of performance degradation expected from igniter 30 as a function of spark count (C). Accordingly, the estimated total number of sparks available from igniter 30 may be determined based on a specific level of degradation of performance of igniter 30 and may in some cases be selected to be representative of a specific type of wear that is expected from igniter 30 operating under specific conditions. In various embodiments, the estimated total number of sparks available from igniter 30 or any other indication of remaining life of igniter 30 may be based on a threshold where the probability of failure of igniter 30 becomes unacceptable.

The determination of estimated remaining life of igniter 30 may be done by controller 20 and/or by another device such as maintenance-related equipment 40 or by another party such as operation or maintenance personnel 42. In various embodiments, the determination of estimated remaining life of igniter 30 may be done by comparing the commanded spark count (C) with data in a suitable look-up table. As mentioned above, the commanded spark count (C) may be a total accumulated spark count for the specific igniter 30. In various embodiments, the commanded spark count (C) may be used since the data may be available to controller 20 without requiring specific sensors or other means for determining the number of sparks actually produced by igniter 30. Alternatively, an actual (e.g., sensed, confirmed) accumulated spark count could be used for the purpose of health monitoring of igniter 30.

Once the accumulate commanded spark count (C) has reached a predetermined threshold value, controller 20 may output one or more signals indicative of an alert. For example, the one or more signals 36 indicative of wear/remaining life of igniter 30 may include such alert(s). The alert may be intended for an operator or custodian of engine 10 or may be intended for maintenance personnel of engine 10. The predetermined threshold value may be selected to indicate that igniter 30 is within a predetermined range of its estimated expected life or has reached or exceeded its estimated expected life. In various embodiments, the predetermined threshold value at which an alert may be generated may be selected to indicate that igniter 30 may be due for a maintenance event such as an inspection or other corrective or preventive action. For example, the predetermined threshold value may be selected to indicate that igniter 30 has reached a particular milestone in its estimated expected life. For example, multiple predetermined threshold values could be selected to provide indications of various stages within the estimated expected life of igniter 30 for maintenance or other reasons or may be based on probabilities of failure. In various embodiments, the indication of wear and/or remaining life of the igniter 30 may be selected to indicate that a maintenance task such as inspection, service or replacement of the igniter 30 is due.

An alert message may be delivered to a display in a cockpit of an aircraft to which engine 10 may be mounted. In various embodiments, the alert message may be indicative of the wear or remaining life of igniter 30 and may delivered to the display in the cockpit upon a failed ignition attempt made by igniter 30. For example, the alert may accompany another message or warning of the failed ignition attempt made by igniter 30.

In addition to spark count (C), the life or health of igniters may be affected by other factors including environmental conditions to which such igniters may be exposed and under which the igniters may be operating. Accordingly, controller 20 may also be configured (e.g., via instructions 38) to take into consideration other factors that may affect the life of igniter 30. For example, such other factors may be combined with the commanded spark count (C) in order to determine an indication of wear or life of igniter 30. Such additional factors may, for example include an average temperature T4 to which igniter 30 may be exposed and also a number of operating hours of engine 10 since the entry into service of igniter 30. Average temperature T4 may be a temperature inside combustor 16 and may be sensed or calculated based on one or more other temperatures monitored within engine 10. In any event, average temperature T4 and the number of operating hours may be available to controller 20 for the purpose of determining the wear or remaining life of igniter.

In various embodiments, temperature T4 and the number of operating hours may be combined with the accumulated spark count (C) to determine the wear or remaining life of igniter 30. The combination of the accumulated commanded spark count (C) with other factors may be represented by a suitable look-up table according to known or other methods. For example, the estimated total number of sparks available from igniter 30 may vary based on average temperature T4 and/or the number of operating hours of engine 10. Alternatively, average temperature T4 and the number of operating hours of engine 10 may be used to conduct wear and/or remaining life assessments that are independent from the accumulated commanded spark count (C). For example, controller 20 may be configured to generate signals indicative of wear and/or life of igniter 30 based on average temperature T4 alone or the number of operating hours alone or in combination with the commanded spark count or other factors. The average temperature T4 may be combined with a corresponding amount of time that igniter 30 may have been exposed to temperature T4. The average temperature T4 may be that at start-up, during operation of combinations thereof. For example, different average temperatures T4 of different phases of operation (e.g., flight) may be considered in the determination of the estimated remaining life of igniter 30.

Figure 5:
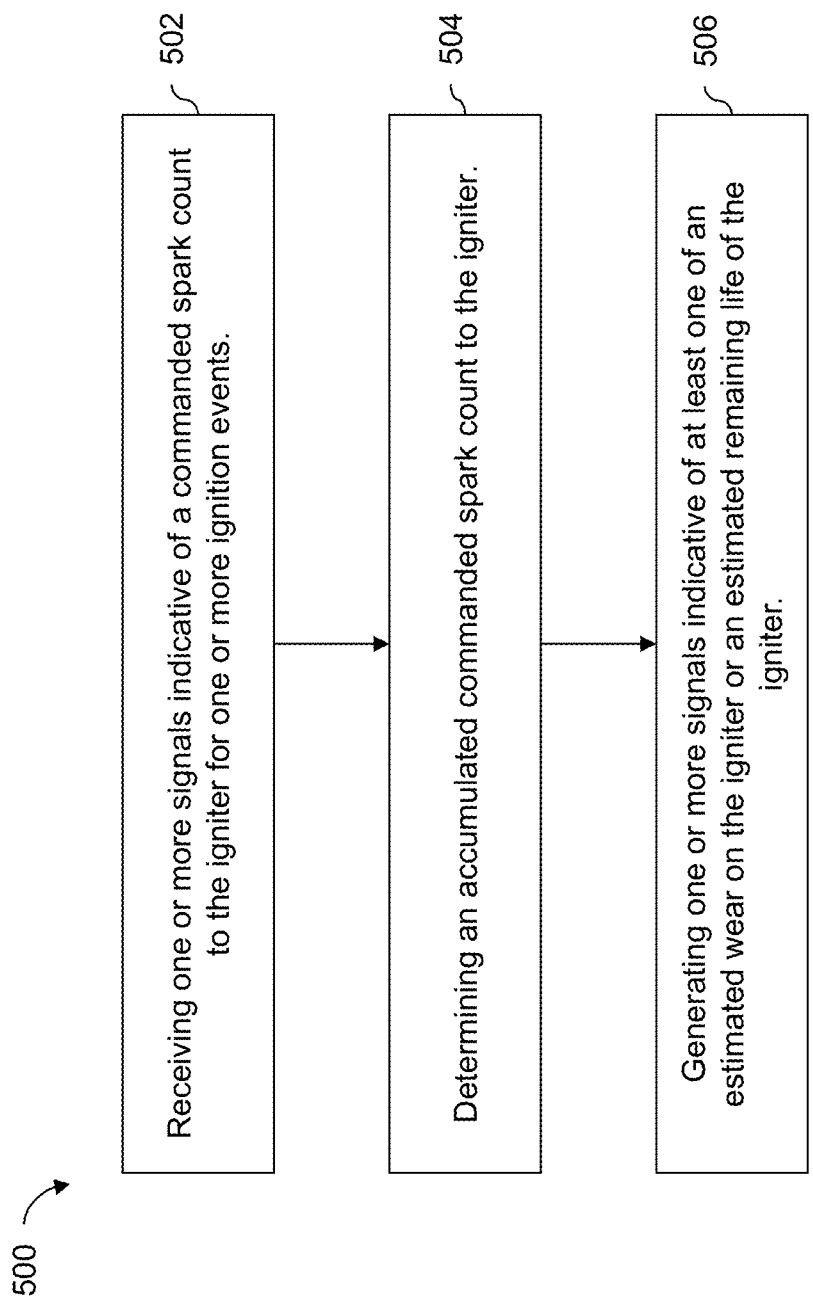
FIG. 5 is a block diagram illustrating an exemplary method for conducting health monitoring of an igniter.

FIG. 5 is a block diagram illustrating an exemplary method 500 in accordance with the present disclosure that may be used for conducting health monitoring of igniter 30. Method 500 may include: receiving one or more signals 34 indicative of a commanded spark count to igniter 30 for one or more ignition events (see block 502); processing the one or more signals 34 indicative of the commanded spark count to igniter 30, determining a total accumulated commanded spark count to igniter 30 (see block 504); and generating one or more signals 36 indicative of at least one of an estimated wear on the igniter or an estimated remaining life of igniter 30 based on the total accumulated commanded spark count to igniter 30 (see block 506).

As mentioned above, method 500 may be computer-implemented and may be performed by controller 22 or other suitably configured data processing device(s). The performance of method 500 may be based on computer-readable instructions 38 by controller 22 and stored on computer-readable medium or media (e.g., memory(ies) 24).

Health monitoring of igniter 30 may be based on other factors in addition to or instead of accumulated spark count so method 500 may comprise: receiving one or more signals indicative of one or more temperatures T4 to which igniter 30 may be exposed; receiving one or more signals indicative of one or more exposure times associated with the one or more temperatures T4; and generating one or more signals indicative of at least one of an estimated wear on igniter 30 or the remaining life of igniter 30 based on the one or more temperatures T4 and associated one or more exposure times.

Health monitoring of igniter 30 may also be based on the operating hours of engine 10 so method 500 may comprise: receiving one or more signals indicative of operating hours of gas turbine engine 10 since the entry into service of igniter 30; and, generating one or more signals 36 indicative of at least one of an estimated wear on igniter 30 or the remaining life of igniter 30 based on the operating hours.

In various embodiments, the signal(s) indicative of wear and/or remaining life of igniter(s) 30 may be used as a basis for the scheduling and/or performance of maintenance-related activities such as one or more corrective or preventive actions. For example, following the generation of such signals one or more maintenance-related actions such as inspecting, servicing or replacing the igniter(s) may be scheduled and/or carried out.

The above description is meant to be exemplary only, and one skilled in the relevant arts will recognize that changes may be made to the embodiments described without departing from the scope of the invention disclosed. For example, the blocks and/or operations in the flowcharts and drawings described herein are for purposes of example only. There may be many variations to these blocks and/or operations without departing from the teachings of the present disclosure. For instance, the blocks may be performed in a differing order, or blocks may be added, deleted, or modified. The present disclosure may be embodied in other specific forms without departing from the subject matter of the claims. Also, one skilled in the relevant arts will appreciate that while the systems, devices and methods disclosed and shown herein may comprise a specific number of elements/components, the systems, devices and methods could be modified to include additional or fewer of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims.

What is claimed is:

1. A method for generating a signal useful in the health monitoring of an igniter of a gas turbine engine, the method comprising:
   receiving one or more signals indicative of a commanded spark count to the igniter for one or more ignition events;
   processing the one or more signals indicative of the commanded spark count to the igniter, determining a total accumulated commanded spark count to the igniter; and
   generating one or more signals indicative of at least one of an estimated wear on the igniter or an estimated remaining life of the igniter based on the total accumulated commanded spark count to the igniter.

2. The method as defined in claim 1, wherein the one or more signals indicative of a commanded spark count comprise one or more signals indicative of a commanded spark rate and one or more signals indicative of a commanded spark duration.

3. The method as defined in claim 1, wherein the estimated remaining life comprises an estimated spark count remaining in the life of the igniter.

4. The method as defined in claim 1, comprising comparing the total accumulated commanded spark count of the igniter with an estimated total spark count available in the life of the igniter.

5. The method as defined in claim 4, comprising, conditioned upon the determination of the total accumulated commanded spark count having reached or being within a predetermined range of the estimated total spark count, generating an alert.

6. The method as defined in claim 5, wherein the alert is generated conditioned upon a failed ignition attempt made by the igniter.

7. The method as defined in claim 1, comprising:
   receiving one or more signals indicative of one or more temperatures to which the igniter is exposed;
   receiving one or more signals indicative of one or more exposure times associated with the one or more temperatures; and
   generating one or more signals indicative of at least one of the estimated wear on the igniter or the remaining life of the igniter based on the one or more temperatures and associated one or more exposure times.

8. The method as defined in claim 1, comprising receiving one or more signals indicative of operating hours of the gas turbine engine since an entry into service of the igniter and generating one or more signals indicative of at least one of the estimated wear on the igniter or the remaining life of the igniter based on the operating hours.

9. A method for generating a signal useful in the health monitoring of an igniter of a gas turbine engine, the method being performed by a digital engine controller of the gas turbine engine and comprising:
   receiving one or more signals indicative of a commanded spark rate and one or more signals indicative of a commanded spark duration for one or more ignition events of the igniter;
   processing the one or more signals, determining a total accumulated commanded spark count to the igniter; and
   generating one or more signals indicative of at least one of an estimated wear on the igniter or an estimated remaining life of the igniter based on the total accumulated commanded spark count to the igniter.

10. The method as defined in claim 9, comprising:
    receiving one or more signals indicative of one or more temperatures to which the igniter is exposed;
    receiving one or more signals indicative of one or more exposure times associated with the one or more temperatures; and
    generating one or more signals indicative of at least one of the estimated wear on the igniter or the remaining life of the igniter based on the one or more temperatures and associated one or more exposure times.

11. The method as defined in claim 10, comprising receiving one or more signals indicative of operating hours of the gas turbine engine since an entry into service of the igniter and generating one or more signals indicative of at least one of the estimated wear on the igniter or the remaining life of the igniter based on the operating hours.

12. The method as defined in claim 9, wherein the estimated remaining life comprises an estimated spark count remaining in the life of the igniter.

13. The method as defined in claim 9, comprising comparing the total accumulated commanded spark count of the igniter with an estimated total spark count available in the life of the igniter.

14. The method as defined in claim 13, comprising, conditioned upon the determination of the total accumulated commanded spark count having reached or being within a predetermined range of the estimated total spark count, generating an alert.

15. A non-transient computer-readable medium or media comprising data representing instructions configured for causing a digital engine controller of a gas turbine engine to:
  using data indicative of a commanded spark count to the igniter for one or more ignition events, determine a total accumulated commanded spark count to the igniter and generate data indicative of the total accumulated commanded spark count;
  generate data indicative of at least one of an estimated wear on the igniter or an estimated remaining life of the igniter based on the total accumulated commanded spark count to the igniter; and
  store the data indicative of at least one of an estimated wear on the igniter or an estimated remaining life of the igniter in persistent computer-readable memory.

16. The non-transient computer-readable medium or media as defined in claim 15, wherein the data indicative of a commanded spark count comprises data indicative of a commanded spark rate and data indicative of a commanded spark duration.

17. The non-transient computer-readable medium or media as defined in claim 15, wherein the estimated remaining life comprises an estimated spark count remaining in the life of the igniter.

18. The non-transient computer-readable medium or media as defined in claim 15, wherein the instructions are configured for causing the digital engine controller of the gas turbine engine to: generate data indicative of an alert if the total accumulated commanded spark count has reached or is within a predetermined range of a predetermined total spark count.

19. The non-transient computer-readable medium or media as defined in claim 15, wherein the instructions are configured for causing the digital engine controller of the gas turbine engine to:
  using data indicative of one or more temperatures to which the igniter is exposed and one or more exposure times associated with the one or more temperatures, generate data indicative of at least one of the estimated wear on the igniter or the remaining life of the igniter based on the one or more temperatures and associated one or more exposure times.

20. The non-transient computer-readable medium or media as defined in claim 15, wherein the instructions are configured for causing the digital engine controller of the gas turbine engine to:
  using data indicative of operating hours of the gas turbine engine since an entry into service of the igniter, generate data indicative of at least one of the estimated wear on the igniter or the remaining life of the igniter based on the operating hours.

* * * * *